US 6,556,968 B1

(12) United States Patent
Shiono

(10) Patent No.: US 6,556,968 B1
(45) Date of Patent: Apr. 29, 2003

(54) DATA TERMINAL WITH SPEECH RECOGNITION FUNCTION AND SPEECH RECOGNITION SYSTEM

(75) Inventor: Katsumi Shiono, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,971

(22) Filed: Nov. 12, 1999

(30) Foreign Application Priority Data

Nov. 12, 1998 (JP) .......................... 10-322305

(51) Int. Cl.[7] .................... G10L 15/16; G10L 19/14
(52) U.S. Cl. .................. 704/233; 704/233; 704/226
(58) Field of Search ............... 704/201, 226, 704/227, 231, 233, 235, 243, 251

(56) References Cited

U.S. PATENT DOCUMENTS 5,764,852 A * 6/1998 Williams .................. 704/201
6,324,499 B1 * 11/2001 Lewis et al. ............. 704/233

FOREIGN PATENT DOCUMENTS

| JP | 62-91047 | 4/1987 |
|---|---|---|
| JP | 62-150295 | 7/1987 |
| JP | 2-56600 | 2/1990 |
| JP | 2-83593 | 3/1990 |
| JP | 4-58297 | 2/1992 |
| JP | 4-181846 | 6/1992 |
| JP | 5-48702 | 2/1993 |
| JP | 7-283857 | 10/1995 |
| JP | 8-211892 | 8/1996 |
| JP | 11-194797 | 7/1999 |

* cited by examiner

Primary Examiner—Marsha D. Banks-Harold
Assistant Examiner—V. Paul Harper
(74) Attorney, Agent, or Firm—Young & Thompson

(57) ABSTRACT

By an operation in an operating unit 12, voice recognition, i.e., a process of recognizing voice inputted from a microphone 17, is started. A voice recognizing unit 15 executes the process of recognizing voice inputted from the microphone 18. When the result of recognition is certified, it is displayed on a display unit 13, and a loudspeaker 18 is caused to output the recognition result in voice. To prevent erroneous operation when a wind-breaking sound generated by moving a portable telephone set a handling noise generated by taking hold of the portable telephone set afresh is inputted from the microphone 17 after the start of the voice recognition by the operation in the operating unit, recognition words for preventing erroneous operation due to noise are registered, and voice recognition is automatically started again when a recognition word for preventing erroneous operation due to noise is recognized after the recognition start.

3 Claims, 3 Drawing Sheets

DATA TERMINAL WITH SPEECH RECOGNITION FUNCTION AND SPEECH RECOGNITION SYSTEM

BACKGROUND OF THE INVENTION

The present invention relates to data terminals with voice recognition function and voice recognition system, more particularly, to portable data terminal and voice recognition system having a voice recognition function. The term "voice recognition" is used herein to refer to what is more commonly known as "speech recognition" or "word recognition" that denotes what is being said, rather than who is speaking.

Recently, in a portable telephone set, a voice recognition function is utilized without operating ten keys. The voice recognition is performed for the pronounced name of the opposite side destination through a microphone.

In such a portable telephone set, a voice to be recognized is preliminarily registered through the microphone. When a voice which is recognized to be the same as the registered voice is generated, a call making or like operation is performed in response to this voice.

Such a portable telephone set can be used in any place as its service area, so that it may be used in noisy places or high noise level places. In such a case, ambient noise or noise sounds may be added to voice inputted from the microphone when making a call or the like. This may result in failure of detection of coincidence of the inputted voice with a preliminarily registered voice or erroneous judgment that the inputted voice is coincident with a different voice.

To solve such a problem, it is conceivable to register words for the voice recognition in a high noise level place. Also, it is conceivable to end the voice recognition process when it is judged that noise is inputted.

By adopting either one of the above two methods, it is possible to prevent erroneous voice recognition even in the case when the ambient noise level is high. However, it is impossible to prevent erroneous voice recognition under the noisy condition after the start of the voice recognition as a result of bringing the microphone of the portable telephone set to be closer to the mouth or bringing the loudspeaker into contact with an ear for listening to the voice from the loudspeaker. In the latter case, it is necessary to start the voice recognition once again by executing a voice recognition starting operation.

SUMMARY OF THE INVENTION

An object of the present invention is to solve the above problems and provide a portable data terminal and voice recognition system having an improved voice recognition function.

Another object of the present invention is to provide a portable data terminal and voice recognition system capable of improving the erroneous voice recognition possibility in the voice recognition.

A further object of the present invention is to provide a portable data terminal and voice recognition system capable of preventing erroneous voice recognition due to suddenly occurring noise or noise generated by taking hold of the terminal afresh.

According to an embodiment of the present invention, there is provided a portable data terminal comprising: a microphone for inputting voice; a memory for registering voice recognition words in advance; and voice recognition means for executing voice recognition with respect to voice inputted from the microphone and reading out a voice recognition word corresponding to the inputted voice; voice recognition being prohibited when noise other than voice is detected at the time of the voice recognition.

The portable data terminal further comprises registering means for preliminarily registering patterns for pulling in the noise.

The portable data terminal further comprises means for informing, when noise other than the voice is detected, that the voice recognition is prohibited.

In the portable data terminal, the detection of noise other than the voice is done within a predetermined period of time from the instant of the voice recognition start.

According to another embodiment of the present invention, there is provided a voice recognition system for recognizing an input sound in which words to be recognized and predetermined noise sounds are preliminary registered as recognition subjects and noise, and when the input sound is recognized as the noise, the recognition is not performed or the recognition result is ignored.

According to other embodiment of the present invention, there is provided a voice recognition system for recognizing an input sound in which words to be recognized and predetermined noise sounds are preliminary registered as recognition subjects and noise, the recognition process is performed after lapse of a predetermined time, and when the input sound is recognized as the noise, the recognition is not performed or the recognition result is ignored.

In the voice recognition system, when the input sound is recognized as the noise, the recognition process is again performed and when the input sound is recognized as the noise, its recognition result is displayed or produced in voice.

In the voice recognition system, the noise recognition is performed within a predetermined time.

Other objects and features will be clarified from the following description with reference to attached drawings.

PREFERRED EMBODIMENTS OF THE INVENTION

Preferred embodiments of the present invention will now be described with reference to the drawings.

Figure 1:
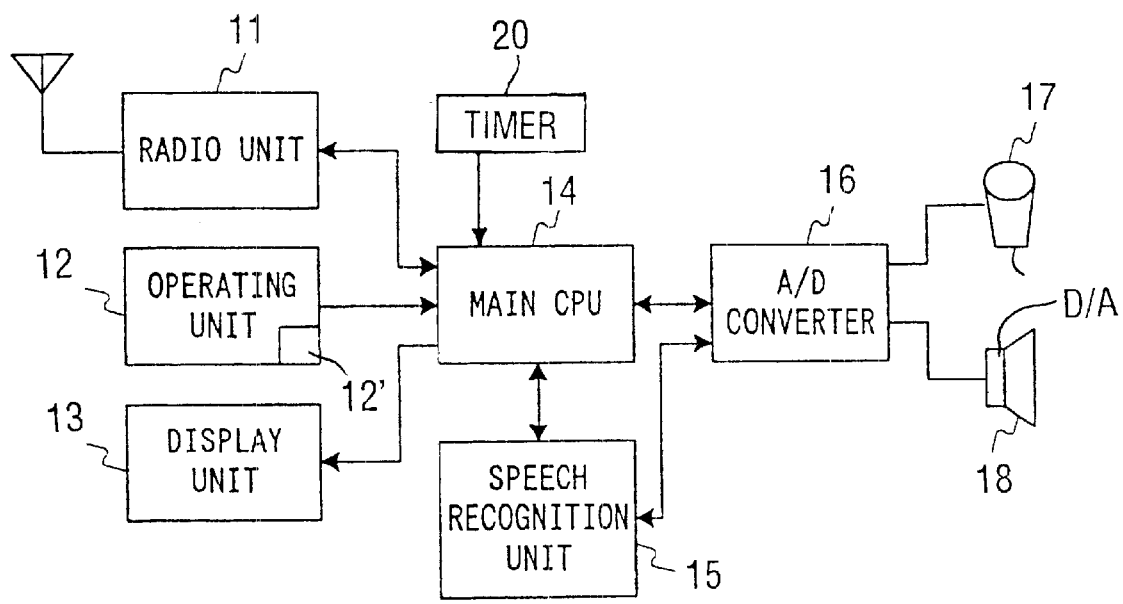
FIG. 1 is a view showing the construction of a portable telephone set as a typical portable data terminal according to the present invention.

FIG. 1 is a view showing the construction of a portable telephone set as a typical portable data terminal according to the present invention. The present invention is not limited to portable telephone sets, but it is applicable to any terminal, which can be used in a movable state and has a function of voice recognition; for instance, it is applicable to a PHS, a pager and an electronic notebook.

Referring to FIG. 1, the illustrated construction according to the present invention comprises a radio unit 11 for transmitting and receiving the radio signal to and from a base station (not shown), an operating unit 12 for causing portable telephone set operation and also starting voice recognition, a display unit 13 for displaying numerals, characters, etc., a main CPU 14 for controlling the entire portable telephone set and also controlling voice recognition LSI, a voice recognition unit 15, an A/D converter 16 for analog/digital converting voice data with respect to the voice recognition unit 15, a microphone 17 for inputting voice, and a loud-speaker 18 (having a D/A converter) for producing a start tone at the time of voice recognition start and also generating the recognition result in voice.

The voice recognition is started by depressing a voice recognition start key in the operating unit 12. When the voice recognition start key 12' in the operating unit 12 is depressed, the main CPU 14 detects this voice recognition start key depression, and sends a voice recognition start command to the voice recognition unit 15. When the voice recognition unit 15 receives the start command from the main CPU 14, it executes the voice recognition process for the voice from the microphone 17. The voice signal from the microphone 17 is digitally converted in the A/D converter 16 and then inputted to the voice recognition unit 15 for the voice recognition. As recognition words used for the voice recognition, the user inputs desired words by key operation unit to the operating unit 12. Alternatively, the input may be performed in voice from the microphone 17.

In addition to the desired recognition words registered by the user, recognition words for detecting erroneous operation due to the noise are registered by the main CPU 14 in the voice recognition unit. The registration is preferably done before shipment of the portable telephone set. Among the noises which may cause erroneous recognition are suddenly occurring noises such as collision sounds, for instance "bangs", and wind-breaking sounds or handling noises generated by moving or taking hold afresh of the portable telephone set for inputting voice from the microphone right after the voice recognition start. Patterns for pulling in these types of noises are registered in advance as recognition words. When these noises are recognized at the time of the voice recognition, it is highly possible to erroneous recognize voice generated by the user. Therefore, in this case it is informed that voice recognition is now impossible.

Specifically, when a sudden noise is inputted from the microphone 17 at the time of the voice recognition, a recognition word for preventing (detecting) erroneous operation due to the noise is recognized and a message informing that noise is recognized is outputted to the display unit 13. AS stated before it is conceivable that an erroneous operation results from the handling noise or the wind-breaking sound generated by taking hold afresh of or moving the portable telephone set for inputting voice from the microphone right after the voice recognition start. Thus, when the recognition word for preventing erroneous operation due to the noise is recognized within several seconds from the instant of the voice recognition start, no recognition result is outputted to the display unit 13. Instead, the CPU 14 sends out a voice recognition start command again to the voice recognition unit 15 for starting the voice recognition process. Thus, voice recognition process for the voice inputted from the microphone 17 is started again for preventing erroneous operation due to the generated right after the voice recognition start.

Figure 2:
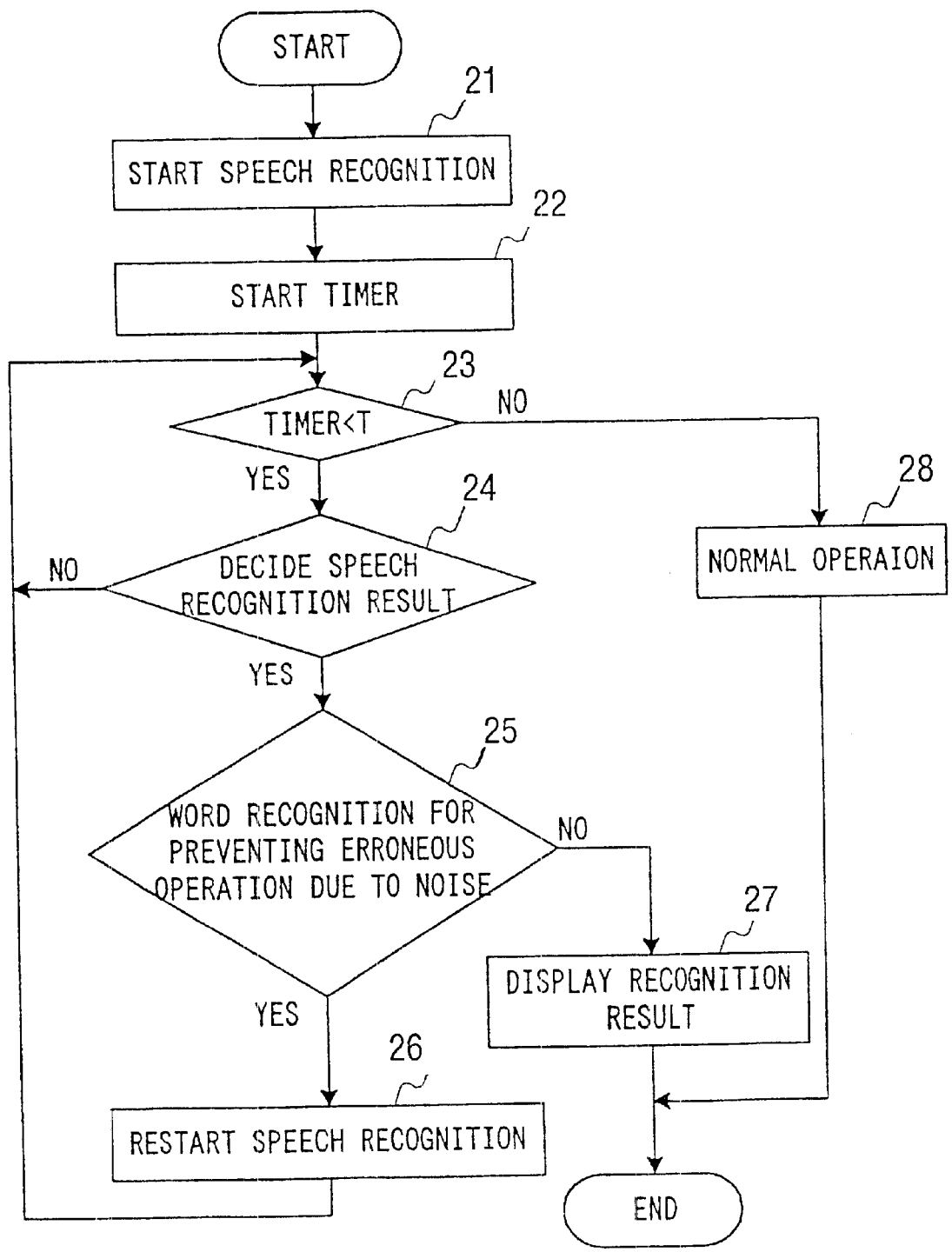
FIG. 2 is a flow chart showing the operation of an embodiment of the present invention.

The operation of a suitable embodiment of the present invention will now be described with reference to FIGS. 1 and 2. When a voice input key in the operating unit 12 is depressed, the main CPU 14 detects the depression of the voice input key, and sends out a voice recognition start command to the voice recognition unit 15. Here, the recognition words which are recognized in the voice recognition unit 15 are those inputted by the user from the operating unit 12, those set as desired and inputted from the microphone 17 by the user, and those for prevention of erroneous operation due to the noise as registered by the CPU 14. Upon start of the voice recognition (step 21), the time 20 is started (step 22).

When T seconds as measured by the timer has been elapsed (step 23), normal operation of voice recognition (step 28) is executed that is, a process of recognizing voice inputted from the microphone 17 is executed. When the voice recognition result is certified, the recognition result is outputted to the display unit 13 and the loudspeaker 18 to produce the voice recognition result in voice.

When the recognition word for prevention of erroneous operation due to the noise is recognized, a message that a recognition word other than those registered in a recognition dictionary has been recognized, is displayed on the display unit 13. When the voice recognition result is certified before the lapse of T seconds as measured by the timer (step 24), the CPU 14 executes a check process as to whether the voice recognition result is a word registered as desired by the user or a word for prevention of erroneous operation due to the noise (step 25).

When the voice recognition result is a word registered as desired by the user, the voice recognition result is informed, that is, it is outputted to the display unit 13 to display it, and the loudspeaker 18 to produce the result (step 27) in voice. When the voice recognition result is the word for prevention of erroneous operation due to the noise, the main CPU 14 sends put a voice recognition start command once again to the voice recognition unit 15, thus restarting the voice recognition process (step 26).

When the word for prevention of erroneous operation due to the noise is recognized before the lapse of T seconds as measured by the timer started after the voice recognition start, the voice recognition is continuously restarted for the execution of the voice recognition process until a voice recognition word set as desired by the user is certified as the voice recognition result. Thus, it is possible to prevent erroneous operation due to the handling noise or the wind-breaking sound generated by taking hold of the portable telephone set afresh or by moving the set right after the voice recognition start.

Figure 3:
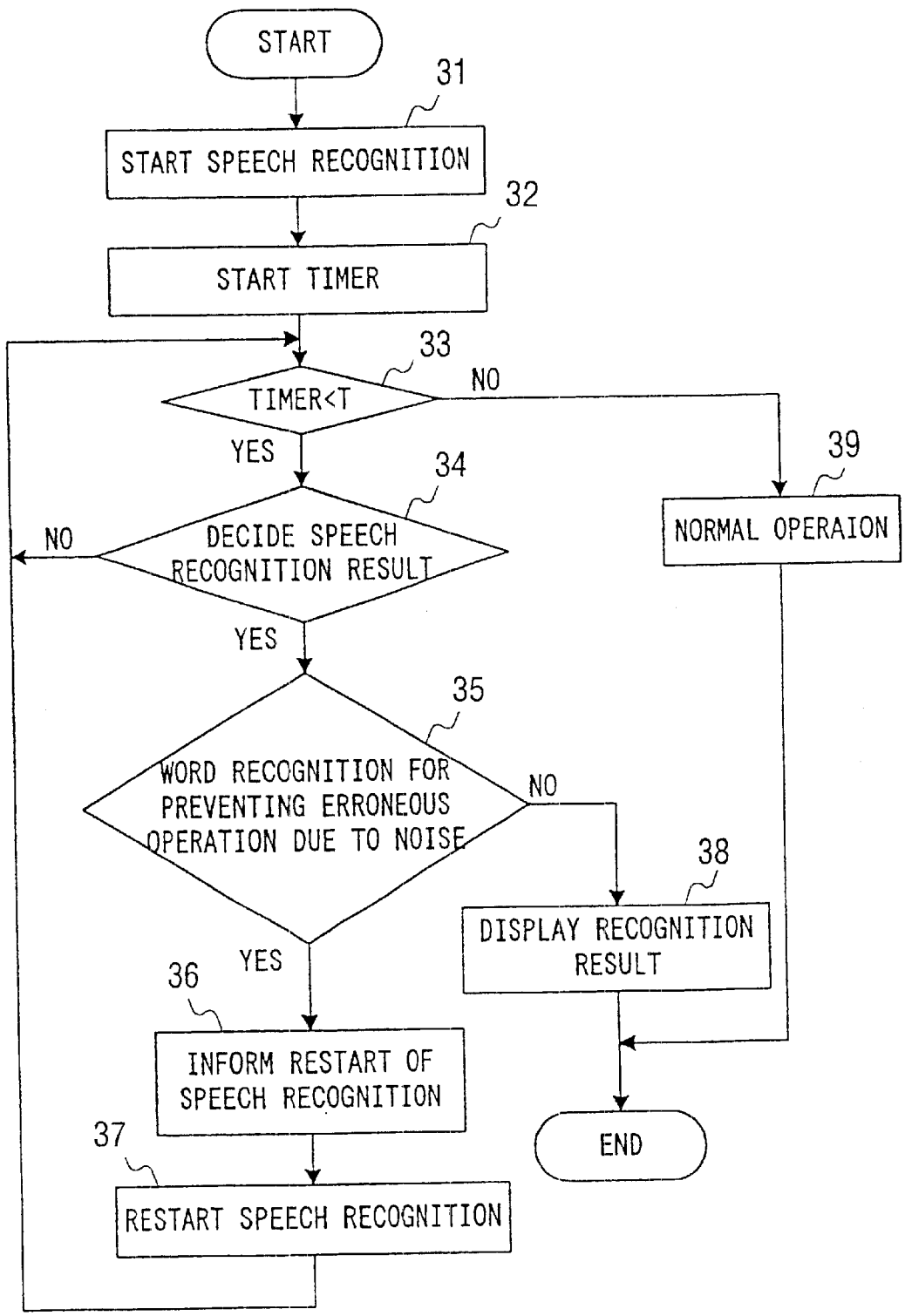
FIG. 3 is a flow chart showing the operation of another embodiment of the present invention.

A second embodiment of the present invention will now be described with reference to FIG. 3. When a voice input key in the operating unit 12 is depressed, the main CPU 14 detects the depression of the voice input key, and sends out a voice recognition start command to the voice recognition unit 15. Upon start of the voice recognition (step 31), the timer is started (step 32). When T seconds as measured by the timer has been elapsed (step 33), normal operation of voice recognition (step 39) is executed, that is, a process of recognizing voice inputted from the microphone 17 is executed.

When the recognition result is certified, the result is outputted to the display unit 13 and the loudspeaker 18 to display and produce the voice recognition result in voice. When the recognition word for prevention of erroneous operation due to the noise is recognized, a message that a recognition word other than those registered in the recognition dictionary has been recognized, is displayed on the display unit 13. When the voice recognition result is certified before the lapse of T seconds as measured by the timer (step 34), the CPU 14 executes a check process as to whether the voice recognition result is a word registered as desired by the user or the word for prevention of erroneous operation due to noise (step 35). When the voice recognition result is the word registered as desired by the user, the voice recognition result is confirmed, that is, the recognition result is outputted to the display unit 13, and the loudspeaker 18 to produce the result (step 38).

When the voice recognition result is the word for prevention of erroneous operation due to the noise, restarting the voice recognition is informed to the user (step 36). To this end, a message informing the restarting of the voice recognition is displayed on the display unit 13, and the loudspeaker 18 is caused to produce a voice recognition restart tone. The main CPU 14 further sends a voice recognition start command once again to the voice recognition unit 15, thus restarting the voice recognition process (step 37).

When the word for prevention of erroneous operation due to the noise is recognized before the lapse of T seconds as measured by the timer started after the voice recognition start, it is informed to the use that the voice recognition is to be started again, and the voice recognition is restarted for the execution of the voice recognition process until the voice recognition word set as desired by the user is certified as the voice recognition result. Thus, it is possible to prevent erroneous operation due to a handling noise of wind-breaking sound generated by taking hold of the portable telephone set afresh by moving the set right after the voice recognition start.

In the above embodiment, it is possible to display a message informing that a word other than those registered in a voice recognition dictionary has been recognized.

As has been described in the foregoing, according to the present invention voice recognition words for prevention of erroneous operation due to the noise are registered as well as those registered as desired by the user. When the voice recognition word for prevention of erroneous operation due to the noise is recognized right after the voice recognition start, voice recognition is automatically started once again for preventing erroneous recognition right after the voice recognition start. It is thus possible to prevent erroneous voice recognition due to noise right after the voice recognition start, thus permitting improvement of the recognition performance and convenience of the voice recognition.

Also, according to the present invention, when restarting voice recognition as a result of recognition of a voice recognition word for preventing erroneous operation due to noise right after the voice recognition start, it is informed to the user that voice recognition is to be started once again. Thus, when restarting the voice recognition, this can be informed to the user. It is thus possible to detect a word forefront at the time of the voice recognition restart, thus permitting improvement of the recognition performance at the time of the restart.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A speech recognition system comprising:

a memory storing words and noises that are not words;

an input device for receiving words and noises that are not words;

a speech recognition unit that recognizes the words and noises that are stored in said memory from among the words and noises received by said input device, and that outputs the recognized words;

a timer that measures a first time period starting when speech recognition by said speech recognition unit is initiated; and a controller that, during the first time period, recommences speech recognition by said speech recognition unit when said speech recognition unit recognizes one of the noises that are stored in said memory from among the noises received by said input device during the first time period, and wherein, during the first time period, said controller continually recommences speech recognition by said speech recognition unit each time said speech recognition unit recognizes one of the noises that are stored in said memory from among the noises received by said input device during the first time period.

2. The speech recognition system of claim 1, further comprising a display that displays a message indicating that speech recognition has been recommenced during the first time period.

3. The speech recognition system of claim 1, further comprising an operating unit with a speech recognition start key that initiates speech recognition by said speech recognition unit.

* * * * *